Dec. 20, 1966   G. J. HAYDEN ETAL   3,292,417
THERMOGRAVIMETRIC BALANCE
Filed Jan. 23, 1964   2 Sheets-Sheet 1

INVENTORS
George J. Hayden
Robert A. Simpson
BY
Donald C. Studley

Dec. 20, 1966  G. J. HAYDEN ETAL  3,292,417
THERMOGRAVIMETRIC BALANCE
Filed Jan. 23, 1964  2 Sheets-Sheet 2

INVENTORS
George J. Hayden
Robert A. Simpson
BY *Donald C. Studley*

United States Patent Office 3,292,417
Patented Dec. 20, 1966

3,292,417
THERMOGRAVIMETRIC BALANCE
George J. Hayden, Hazleton, Pa., and Robert A. Simpson, Sacramento, Calif., assignors to Atlas Chemical Industries, Inc., Wilmington, Del., a corporation of Delaware
Filed Jan. 23, 1964, Ser. No. 339,702
3 Claims. (Cl. 73—15)

The present invention relates to testing devices and more particularly, to an improved apparatus for determining the thermal decomposition rates of materials.

Many types of apparataus are available from laboratory supply houses for making a determination of the thermal decomposition rate of various materials. These devices are generally referred to as thermogravimetric balances. Many of the commercially available thermogravimetric balances facilitate a determination of the rate of thermal decomposition under a variety of controlled conditions, e.g., under predetermined temperatures, in atmospheres of known constitution, under predetermined pressures, or under combinations of changing but controlled atmospheric and temperature conditions, e.g., cycling temperatures or pressures. Thermogravimetric balances are useful in the determination of: (1) High or constant temperature corrosive characteristics of metals, and (2) High or constant temperature storage or use characteristics of organic compounds, e.g., lubricants or plastics.

In accord with the present invention, a thermogravimetric balance is provided which includes a furnace with a weighing assembly positioned therein. The weighing assembly consists of a vertical arrangement of a sensing spring, a means to determine the elongation of the sensing sprinfi, and a sample holder. Suitably the means to determine the elongation of the sensing spring is a transducer coil positioned to be influenced by a movement of a transducer armature positioned in the vertical arrangement of the spring and sample holder. The furnace has a main gas supply inlet and a gas outlet. The main gas inlet is position so that it is below the level of the sample holder and the gas outlet is positioned so that it is above the level of both the main gas inlet and the sample holder. Preferably the outlet and main gas inlet are positioned on opposite sides of the weighing assembly so that a flow of gas is swept across the weighing assembly. The sensing spring is preferably fabricated of a material which is little affected by exposure to high temperatures or corrosive atmospheres, for example, quartz. The transducer may suitably be a transformer wherein a core or armature member is movable within a stationary coil member.

In a preferred embodiment of the present thermogravimetric balance the balance includes an auxiliary gas inlet positioned to direct a flow of entering gas downward along the length of the weighing assembly. A flow of gas downward along the weighing assembly prevents an upward flow of gaseous products which may emanate from a volatile sample. If not prevented such gaseous products may coat or corrode the weighing assembly and be responsible for erroneous weight readings. A flow of gas across the weighing assembly from the main gas inlet also aids in the prevention of an upward flow of undesirable gases along the weighing assembly and in addition with the position of the gas outlet, on a side of the weighing assembly opposite that of the main gas inlet, tends to whisk gases formed in the sample holder out of the furnace with a minimum of contact time with the weighing assembly. It is desirable that the gas flow from the auxiliary gas inlet positioned to direct a flow of gas downward along the length of the weighing assembly be directed along more than one side of the weighing assembly. Suitably this is done by utilizing two or more directed ports.

The invention will more particularly be described with reference to the attached drawings wherein similar parts in each of the views are indicated by similar numbers.

Figure 1:
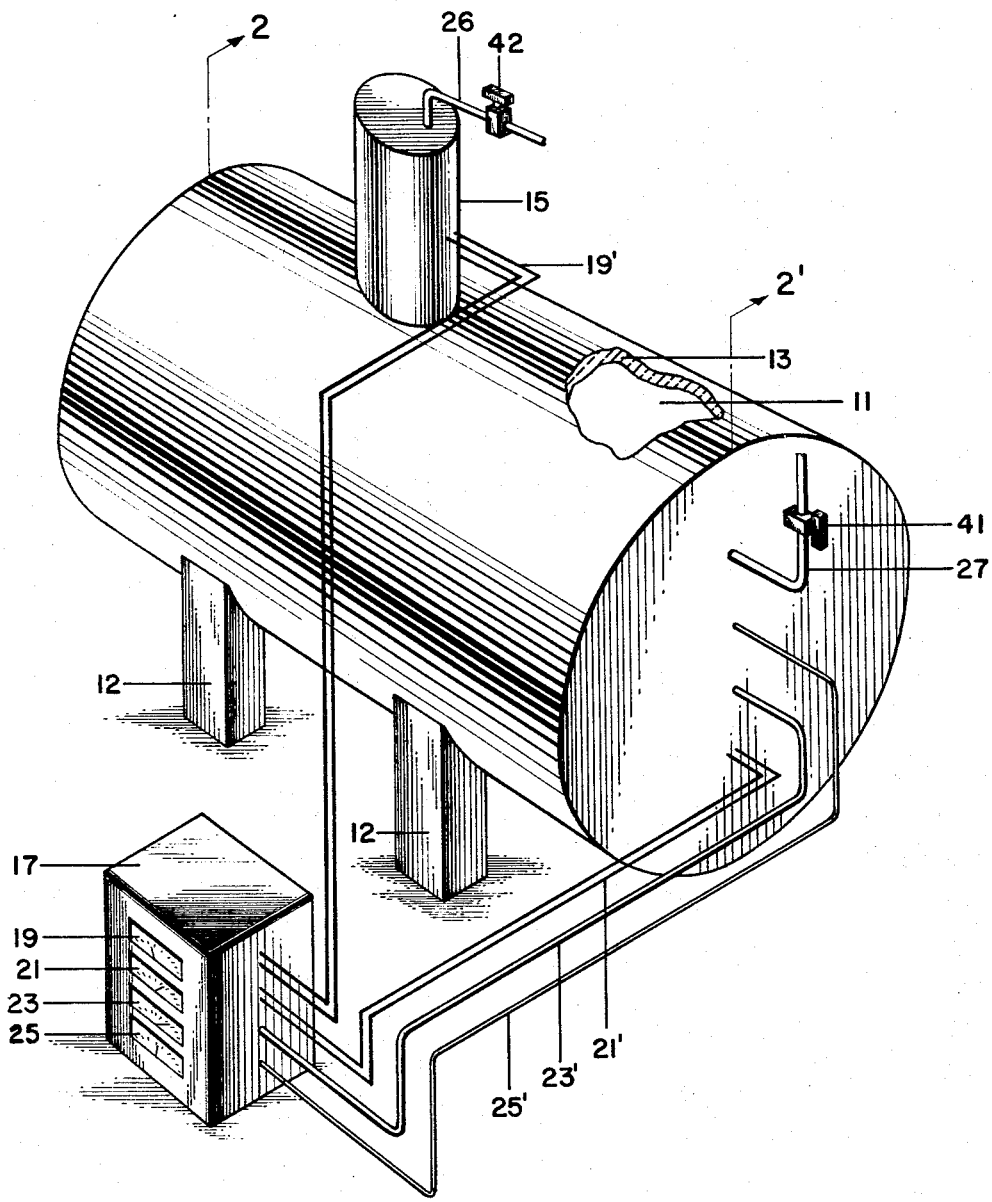
FIGURE 1 is a perspective view of a thermogravimetric balance having a portion of the outside insulation in section.

Looking at FIGURE 1, furnace body 11 preferably fabricated of a corrosion resistant metal such as stainless steel or aluminum is covered with insulation 13 suitably of asbestos or glass wool. A cupola 15 is mounted atop furnace 11. Cupola 15 also is preferably fabricated of a corrosion resistant material and is insulated in a manner similar to furnace 11. An instrument panel such as 17 is preferably positioned near furnace 11. As shown, instrument panel 17 has facilities for indicating various conditions within furnace 11, for example, a gas flow indicator 19, a temperature indicator 21, a pressure indicator 23 and a weight indicator 25. Each indicator is connected to an appropriate sensing means within the furnace by connecting lines 19' and 21', 23' and 25'. Furnace 11 is equipped with gas inlet lines 26 and 27 entering cupola 15 and furnace body 11 and having control valves 41 and 42.

Figure 2:
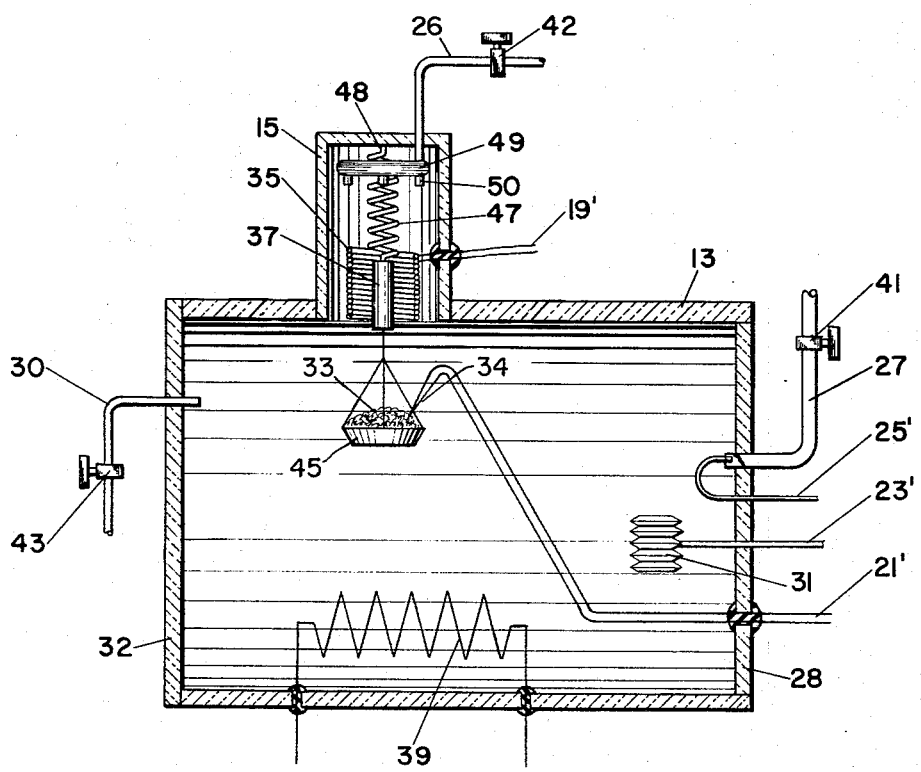
FIGURE 2 is a cross section view taken along line 2 and 2' of FIGURE 1.

FIGURE 2 is a view in cross section taken along lines 2 and 2' of FIGURE 1. FIGURE 2 shows an arrangement of various elements within the furnace. Line 27 is the main gas inlet line and enters end 28 of furnace 11. Line 27 is positioned in relation to line 25' in such a manner that the rate of gas flow through line 27 is indicated by a pressure in line 25'. Line 23' enters end 28 of furnace body 11 and is appropriately connected to a pressure sensing means, for example, a bellows 31. Lines 21' are electrical lines and extend through side 28 of furnace 11. Lines 21' are adapted to signal the temperature in the area contiguous to sample 33. Lines 21' suitably terminate in a thermocouple such as 34. Lines 19' are electrical lines. Lines 19' enter cupola 15 and are connected to a coil 35. Changes in the inductance of coil 35 caused by movement of a transformer armature member 37 are signaled by lines 19'. Although indicating instruments 19, 21, 23 and 25, shown in FIGURE 1, are depicted as meters, it will be understood that a variety of commercially available recorders may be readily used. Cupola 15 houses a portion of a weighing assembly which is comprised of a spring member 47, transformer armature member 37 and sample holder 45. The weighing assembly may suitably be attached to the top of cupola 15 by anchor 48. An auxiliary gas inlet line 26 enters cupola 15 and is adapted to direct a flow of incoming gas downward along the weighing assembly by means of distributing ring 49 and gas ports 50. A gas outlet 30 is positioned in end 32 of furnace 11 and positioned to be on a higher level than the main inlet 27. Furnace 11 may be equipped with an internal heat source such as heating coil 39 which may be utilized to maintain a desired temperature condition in the furnace. The supply of gas through inlets 26 and 27 is controlled by control valves 42 and 41. The pressure with the furnace may be regulated by valve 43 on gas outlet line 30.

In operation a sample 33 is placed in sample holder 45 and the furnace sealed. The conditions within the furnace such as temperature, atmosphere, pressure and gas flow may then be adjusted as desired. An inflow of gas is maintained through main gas inlet line 27 and an outflow of gas is maintained through gas outlet line 30. The gas inlet and outlet arrangement allows a sweep of gas across sample 31. Auxiliary gas inlet line 26 enters cupola 15 and supplies a flow of air downward along the weighing assembly. This arrangement aids in preventing residue on condensation from the sample from contacting the weighing assembly and minimizes the upward flow of gases or condensation from the sample which might otherwise condense on portions of the weighing assembly and thereby give erroneous weights.

In order to balance the gas flow around the sample holder without causing disturbances which would result in erroneous weight readings, the inflow from the main gas inlet 27 and the auxiliary inlet 26 are adjusted so that the respective flow of gas from each inlet substantially counteracts the effect of the gas flow on the weighing assembly. This adjustment may be accomplished by adjusting the gas flow before the introduction of the sample and maintaining a steady flow of gas at the predetermined rates through the outlets during the weighing operation. For example, if the volume of the furnace is considered to be unity, generally gas flows of from about 2 to about 10 volumes per hour from the main gas inlet and from about 2 to about 15 volumes per hour from the auxiliary gas inlet are found to minimize the effect of gas flow on the weighing operation.

What is claimed is:

1. A thermogravimetric balance comprising
   a furnace,
   a weighing assembly positioned in the interior thereof,
   said weighing assembly comprising a vertical arrangement of a sensing spring, a means to determine the elongation of the said sensing spring and a sample holder, a temperature sensing means positioned in the area contiguous to said sample holder,
   a gas inlet positioned in one side of said furnace so that it is located below the level of said sample holder, and
   a gas outlet positioned in the opposite side of said furnace so that it is located above the level of both said gas inlet and said sample holder.

2. The thermogravimetric balance of claim 1 wherein the said means to determine the elongation of the said sensing spring is a transducer armature positioned in said weighing assembly and a transducer coil positioned to be influenced by movement of the said armature.

3. A thermogravimetric balance comprising
   a furnace,
   a weighing assembly positioned in the interior thereof,
   said weighing assembly comprising a vertical arrangement of a sensing spring, a transducer armature, and a sample holder, a temperature sensing means positioned in the area contiguous to said sample holder,
   a transducer coil in a position to be influenced by movement of said armature,
   a main gas inlet positioned in one side of said furnace so that it is located below the level of said sample holder,
   a gas outlet positioned in the opposite side of said furnace so that it is located above the level of both said main gas inlet and said sample holder and
   an auxiliary gas inlet positioned to direct gas downward along said weighing assembly.

References Cited by the Examiner

UNITED STATES PATENTS 3,055,206   9/1962   Watson et al. _____ 73—15

OTHER REFERENCES

Muller, R. H. "Automatic Recording Vacuum Thermobalance Records Weight Changes as a Function of Temperature or Time," In Analytical Chemistry, 32(1): pages 772–78A, January 1960.

"Thermo-Grav," bulletin No. 2328 of American Instrument Co., Inc. March 1960.

Soulen, J. R. et al.: "Improved Methods of Using the Thermobalance To Determine Thermal Stabilities," December Analytical Chemistry, 33(13): pages 1909–1912, December 1961.

Smith, D. A. "Modification of a Thermogravimetric Balance for Pyrolysis Experiments in a Controlled Atmosphere," In Analytical Chemistry, 35(9): pages 1306–1307, August 1963.

RICHARD C. QUEISSER, *Primary Examiner.*

J. C. GOLDSTEIN, *Assistant Examiner.*